United States Patent [19]

Da Silva

[11] 4,068,954
[45] Jan. 17, 1978

[54] MONOCHROMATOR HAVING A CONCAVE HOLOGRAPHIC GRATING

[75] Inventor: Edouard Da Silva, Lille, France

[73] Assignee: Instruments S.A., Ivry-sur-Seine, France

[21] Appl. No.: 647,767

[22] Filed: Jan. 9, 1976

[51] Int. Cl.² .............................................. G01J 3/18
[52] U.S. Cl. ..................................... 356/100; 356/101
[58] Field of Search ............... 350/162 R; 356/74, 75, 356/99, 100, 101

[56] References Cited

U.S. PATENT DOCUMENTS

| | | | |
|---|---|---|---|
| 3,936,191 | 2/1976 | Chupp | 356/101 |
| 3,973,850 | 8/1976 | Pouey | 350/162 R |
| 3,985,443 | 10/1976 | Danielsson et al. | 356/99 |

FOREIGN PATENT DOCUMENTS 2,266,150  10/1975  France .................................. 356/75

*Primary Examiner*—F. L. Evans
*Attorney, Agent, or Firm*—Haseltine, Lake & Waters

[57] ABSTRACT

A monochromator having a concave holographic grating which is turnable in rotation and provided with an inlet slot parallel to the lines of the grating for incident light and an outlet slot also parallel to the lines of the grating, the inlet and outlet slots being disposed on opposite sides of a diametrical median plane P of the grating extending perpendicular to the lines of the grating and passing through the center of the grating. The bisector of the angle A, formed by two lines connecting the center of each slot to the center of the grating is contained in the plane P, the slots being additionally disposed such that the projection $\alpha$ of the angle A on the plane P is $\leq 3°$ and the projection $\beta$ of the angle A on the plane P' containing the bisector and perpendicular to the plane P is $\leq 15°$. Two elementary monochromators can be connected in series and the gratings of the elementary monochromators are carried by a common rotation shaft, the image of the outlet slot of one elementary monochromator being sent to the inlet slot of the following monochromator by an optical system composed of planar mirrors, and a spherical mirror extending parallel to the gratings and turnable around an axis parallel to the axis of the shaft.

6 Claims, 5 Drawing Figures

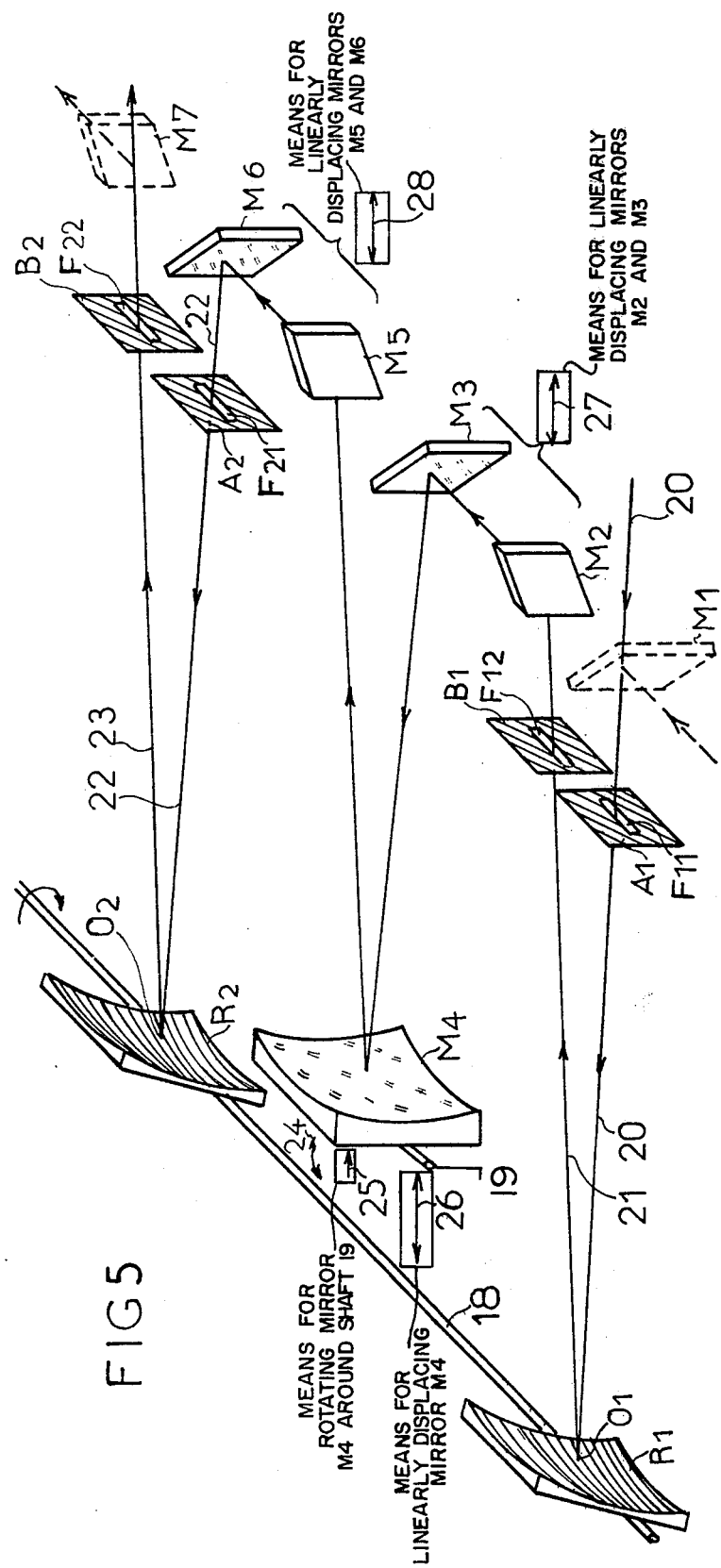

MONOCHROMATOR HAVING A CONCAVE HOLOGRAPHIC GRATING

FIELD OF THE INVENTION

The invention relates to a monochromator having slots and a concave holographic grating, and more particularly, by way of example, to a monochromator adapted to the study of RAMAN spectrums. The invention is also related to apparatus realized by the coupling of a plurality of monochromators of this type.

BACKGROUND

There are known optical monochromators having a grating which for example have described on pages 78 to 81 in, "Applied Optics and Optical Engineering," by Robert J. Meltzer, edited in 1969 by Rudolf Kingslake. The grating monochromators at first utilized a planar grating which necessitated the use of a collimator and an objective. These optical auxiliary members introduce aberrations which generate errors and these have been remedied by the use of concave grating which eliminate the objective and the collimator. The concave gratings, usually engraved, are astigmatic and this deficiency has been recently overcome by the use of concave holographic gratings which reduce the aberrations, notably when they are utilized at optimum angles. These diffraction gratings are manufactured, in particular, by the SOCIETY INSTRUMENTS. S.A., at Longjumeau, France. This society has edited a technical brochure which discloses holographic gratings and the physics of diffraction gratings.

These documents which well illustrate the current state of the art, show that in such known monochromators the inlet and outlet slots are disposed parallel to the lines of the grating and the center of each slot is in a diametral, median plane P of the surface of the grating. The diametal plane itself is perpendicular to the lines of the grating. FIG. 1 shows in very simplified manner this state of the art. Therein in frontal view there is seen a concave grating 31 whose diametral median plane P perpendicular to the lines of the grating, is represented by phantom line 32. The light to be analyzed is passed through the inlet slot 33, and the monochromatic light which is sought is isolated by the outlet slot 34. It is seen that the slots 33 and 34 are each symetrically disposed with respect to the plane P, and the lateral spacing between these slots is relatively substantial. The inlet and outlet slots are fixed and the grating is turnably mounted to selectively make the outlet slot face the portion of the spectrum that one wishes to utilize. It can, therefore, frequently occur unexpectedly that a portion of the spectrum spreads itself to the zone of the inlet slot, thus introducing parasitic light into the system. This disadvantage is not very serious for monochromators operating with sources of relatively great luminosity, but in contrast it becomes a very substantial disadvantage when one operates with RAMAN spectrums. The very low intensities of these rays requires the elimination of all parasitic light and it is also for this reason that monochromators having concave, holographic gratings are utilized which operate under good conditions without the use of auxiliary optical elements for collimation and for focusing.

It is also known in the case of conventional monochromators of the type of FIG. 1 that with a relatively substantial angle of deviation between the mean incident ray passing through the center of the slot and the peak of the grating, and the mean diffracted ray issuing from the peak of the grating and passing through the center of the outlet slot that the quality of the formed spectral image is a maximum in the vicinity of the diametral plane. Similarly, the quality of the spectral image is best if the entry slot only extends slightly on opposite sides of the median plane. For a good quality of image, one seeks, therefore, generally, to utilize inlet and outlet slots of short lengths. This is not a disadvantage when the luminosity is great, but for the study of RAMAN spectrums, having low energy, one is obliged to utilize relatively long slots and the images of the extremities present aberrations resulting in a loss of resolution of the apparatus.

SUMMARY OF THE INVENTION

An object of the present invention is to provide a monochromator which simultaneously permits the use of long slots with good image qualities and avoids the introduction of parasitic light due to the spreading out of the spectrum to the inlet slot.

According to the invention, in a monochromator having a concave, holographic grating orientable in rotation and provided with an inlet slot parallel to the lines of the grating for the incident light, and an outlet slot also parallel to the lines of the grating, the inlet and outlet slots are each disposed entirely on opposite sides of the median. diametral plane P of the grating extending perpendicualr to the lines of the grating and passing through the peak or center of the grating, the bisector of the angle A, formed by lines connecting the center of each slot to the peak of the grating being contained in the plane P, the slots being additionally disposed such that the projection $\alpha$ of the angle A, on the plane P is $\leq$ 3° and the projection $\beta$ of the angle A on the plane P' passing through the bisector and perpendicular to the plane P is $\leq 15°$.

Further features and advantages of the invention will appear more clearly in the description hereafter which is given with reference to several practical embodiments illustrated in the annexed drawings.

BRIEF DESCRIPTION OF THE DRAWING

FIG. 5 is a schematic perspective view of a monochromator employing two coupled basic monochromators according to the invention.

DETAILED DESCRIPTION

Figure 1:
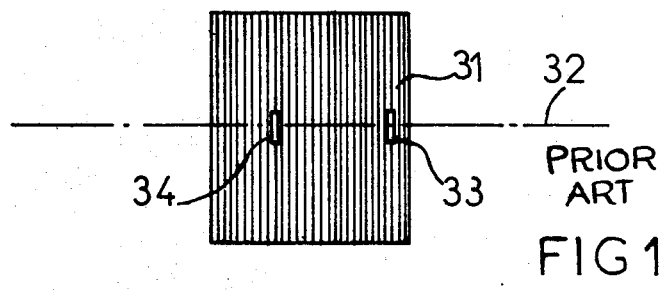
FIG. 1 is a front view diagrammatically illustrating a monochromator according to the prior art.
Figure 2:
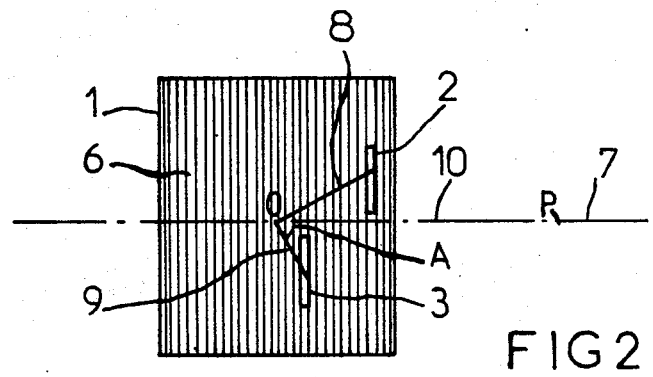
FIG. 2 shows in a manner similar to that in FIG. 1, a simplified fron view of a monochormator according to the invention.
Figure 3:
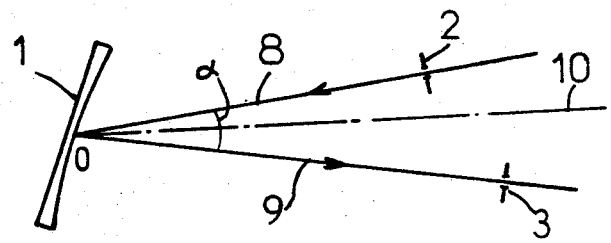
FIG. 3 is a view from above of the monochromator of FIG. 2 taken perpendiculr to the plane P.
Figure 4:
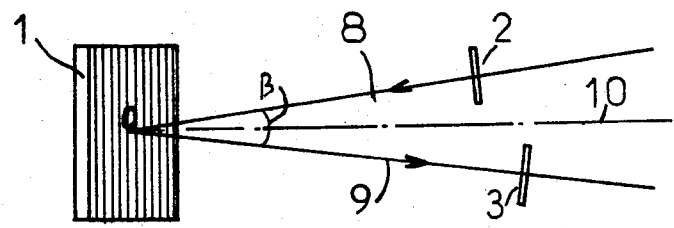
FIG. 4 is a side view of the monochromator in a direction parallel to the plane P.

With reference to FIG. 2, 3, and 4, the monochromator according to the invention comprises a concave, holographic grating 1 carrying lines 6, an inlet slot 2 for incident light, and an outlet slot 3 isolating a wave length of the formed spectrum.

The mean diametral plane P, perpendicular to the lines of the grating and passing through the peak or center O of the grating, is represented by the frontal trace 7 in FIG. 2. The lines 8 and 9, respectively connected to the peak O of the grating and the middle of the slots 2, 3, represent the paths of the mean incident and diffracted light. Line 10 is a bisector of the angle A formed by the lines 8 and 9.

The essential characteristic of the monochromator, thus formed, resides in the construction in which the inlet and outlet slots 2 and 3, are entirely disposed respectively, above and below the diametral, median plane P, while th bisector 10 is contained in this plane P. Another equally important feature is that the angle A is small and thus its projection $\beta$ (FIG. 4), on a plane P' perpendicular to the plane P and containing the bisector 10, is less than 15° and even preferably less than 3°.

Furthermore, the projection $\alpha$ (FIG. 3) of the angle A on the plane P is less than 3° and preferably even zero. A third feature of the invention resides in the construction, wherein, the slots 2 and 3, that is to say the planes in which they are formed are substantially perpendicular to the rays 8 and 9. It is to be noted that in the monochromator, thus formed, the inlet and outlet slots are practically, in front view, in prolongation of one another and consequently in a common diametral plane of the grating. This is especially the case when $\alpha = 0°$. When the grating is turned, to receive the selected wave length facing the outlet slot, the spectrum is transversely displaced with respect to the outlet slot; it cannot, therefore, ever come on the inlet slot and, therefore, cannot carry any parasitic light into the system. In addition, both the inlet and outlets slots are in totality in a diametral plane of the grating which permits obtaining correct images of the spectrum, even with slots of great length when one operates with small energy.

I have, for example, realized a monochromator with a holographic grating on a spherical support of 931 mm radius adapted for the study of RAMAN spectrums. The slots 2 and 3 are 1,012 mm from the peak of the grating. The angle $\beta$ projection of the angle A on the plane P is equal to 3°. The projection angle $\alpha$ of the angle A on plane P is zero. A monochromator thus realized can easily be coupled to at least one other additive or subtractive monochromator. One such coupling is shown in FIG. 5.

The first monochromator simply comprises the grating R1, the inlet slot F11 in the plate A1 for the incident light, and the outlet slot F12 in the plate F1 for a diffracted ray. The second monochromator comprises the grating R2, the inlet slot F21 in the plate A2 for the incident light and the outlet slot F22 in the plate B2 for a diffracted ray. The two monochromators are disposed parallel to one another and it is important to note that the gratings R1 and R2 are fixed on a common shaft 18. The optical connection of the two monochromators is effected by a first optical assembly consisting of two planar mirrors M2 and M3, a spherical mirror, M4, and a second optical assembly consisting of two planar mirros, M5 and M6. The spherical mirror, M4, is substantially parallel to the grating R1 and R2 and is in the vicinity thereof. It is mounted on shaft 19, parallel to the shaft 18. The first median incident ray 20, passes in the slot F11, towards the center 01 of the grting R1 and a diffracted ray 21, passes through the slot F2; it is successively reflected by the mirros M2, M3, M4 and M5, M6 to constitute a mean incident ray 22, for the second monochromator and it passes through the slot F21 towards the center 02 of the grating R2. A diffracted ray 23, passes through the slot F22 and exits from the double monochromator. Of course, one can provide planar supplementary mirros, M1 and M7, shown in dotted outline in FIG. 5, when the inlet rays in the apparatus should be in alignment with the outlet rays and parallel to shaft 18. Although it has not been shown, it is easy to imagine a third monochromator installed in succession of the first two monochromators, the planar mirror M7 constituting the first mirror of a new optical assembly for the incident light 23.

In this association of at least two monochromators, one can realized corrections of coupling, notably for high resolution. Any deficiencies in coupling can be overcome by a slight rotation of the spherical mirror M4 around the shaft 19 as for example shown by arrow 24. For this rotation there can be utilized a mechanical arrangement such as a wedge or a screw with springs, schematically illustrated by arrow 25, and bearing on an edge of the mirror M4.

The selection of the output wave length is made by simultaneous rotation of the two gratings, R1 and R2, around the common shaft 18. It may thus be necessary to effect other corrections because if for a determined wave length, the image of the slot F11, is rigorously made to lie on the slot F12, after diffraction by the grating R1, for another wave length, the image of the slot F11 could be formed behind or in front of the slot F12. In this case, the assembly of the plane mirrors M2, M3, M5, M6 and of the spherical mirror, M4 would no longer rigorously form the image of the slot F12 on the slot F21. In order that the image of the slot F12 is always realized exactly on the slot F21, there are a number of possibilities for correction.

The first possibility consists of displacing the spherical mirror M4 in the direction of arrow 26, that is to say, in the direction of the ray.

Another possibility consists of displacing the assembly of the two mirrors M2 and M3 in the direction of the arrow 27, or the assembly of the two mirrors M5 and M6 in the direction of the arrow 28; these displacements along arrows 27 and 28 are rectilinear displacements in the direction of the incident and reflected rays. One can also combine these three mirror displacements as will be readily evident to those skilled in the act.

The various displacements can be directly controlled by the rotation of the gratings R1 and R2 at the time of the selection of the output wave length in a manner to automatically obtain proper corrections for each wave length. One could provide for this, for example, either a mechanical cam connection or an electronic arrangement from a correction mechanism for the angular position of the shaft 18.

What is claimed is:

1. In a monochromator adapted for the study of RAMAN spectrums having a turntable concave holographic grating with parallel lines and an inlet slot parallel to the lines of the grating for passage of incident light and an outlet slot also parallel to the lines of the grating, for passage of diffracted light, an improvement wherein said inlet and outlet slots are each disposed on opposite sides of a diametral median plane of the grating extending perpendicular to the lines of the grating and passing through the center of the grating, the bisector of the angle formed by two lines connecting the center of each slot to the center of the grating being contained in said diametral plane, the slots being additionally disposed such that the projection of said angle on the diametral plane is $\leq 3°$ and the projection said angle on a second plane passing through the bisector and perpendicular to the diametral plane is $\leq 15°$.

2. In a monochromator as claimed in claim 1, wherein the projection of said angle on sid second plane is $\leqq 3°$.

3. In a monochromator as claimed in claim 1, wherein said slots are each perpendicualr to the respective lines connecting their center to the center of the grating.

4. A monochromator assembly comprising at last two elementary monochromators as claimed in claim 1 coupled in series and in which the gratings of the elementary monochromators are carried by a common rotatable shaft, and optical means for directing the image of the outlet slot of one elementary monochromator to the inlet slot of the successive monochromator, said optical means comprising planar mirrors and a spherical mirror said spherical mirror extending parallel to the gratings and a second rotatable shaft supporting said spherical mirror for rotation, said second shaft being parallel to said first shaft.

5. A monochromator assembly as claimed in claim 4 further comprising means for linearly displacing said mirrors in the direction of the light rays.

6. A monochromator assembly as claimed in claim 4 comprising means for linearly displacing said spherical mirror in the direction of the light rays.

* * * * *